(12) United States Patent
Ishibashi et al.

(10) Patent No.: US 6,728,379 B1
(45) Date of Patent: Apr. 27, 2004

(54) INFORMATION PROCESSOR AND INFORMATION PROCESSING METHOD

(75) Inventors: Yoshihito Ishibashi, Tokyo (JP); Yoshitomo Osawa, Kanagawa (JP); Tateo Oishi, Saitama (JP); Tomoyuki Asano, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/340,900

(22) Filed: Jun. 28, 1999

(30) Foreign Application Priority Data

May 27, 1999 (JP) ............................ 11-148904

(51) Int. Cl.[7] .................... H04N 7/167; H04L 9/00; G06F 17/60; G06F 11/30
(52) U.S. Cl. ................... 380/278; 380/201; 380/279; 380/281; 380/282; 380/283; 380/284; 380/285; 713/193; 705/51; 705/57
(58) Field of Search ..................... 380/278, 279, 380/281, 282, 283, 284, 285, 201; 705/51, 57; 713/193

(56) References Cited

U.S. PATENT DOCUMENTS

| | | | |
|---|---|---|---|
| 5,247,575 A | 9/1993 | Sprague et al. | 380/9 |
| 5,400,403 A | 3/1995 | Fahn et al. | 380/21 |
| 5,892,900 A | 4/1999 | Ginter et al. | 395/186 |
| 6,320,829 B1 * | 11/2001 | Matsumoto et al. | 7/116 |
| 6,438,235 B2 * | 8/2002 | Sims, III | 380/285 |
| 6,463,151 B1 * | 10/2002 | Iitsuka et al. | 380/201 |

* cited by examiner

*Primary Examiner*—Thomas R. Peeso
*Assistant Examiner*—Courtney D. Fields
(74) *Attorney, Agent, or Firm*—Frommer Lawrence & Haug LLP; William S. Frommer

(57) ABSTRACT

An information processor receives at a communication section thereof an encrypted content decryption key generated by encrypting, by a distribution encryption key, a content decryption key for decryption of a content encrypted by a content encryption key. The received encrypted content decryption key is sent to a content key decryption section where it is decrypted. The decrypted content decryption key and copy control code are sent to a content key encryption section where they are encrypted by an encryption key which can be decrypted at an external information processor, namely, a session key, to send an encrypted content decryption key with a copy control code to the external information processor via a communication section.

22 Claims, 10 Drawing Sheets

INFORMATION PROCESSOR AND INFORMATION PROCESSING METHOD

BACKGROUND OF THE INVENTION

1. Field of the Invention

The present invention relates to an information processor and information processing method, adapted to receive and decrypt an encrypted content data and encrypted content decryption key, and control copy of the content data.

2. Description of Related Art

Conventionally, telephone lines, satellite broadcasting circuits, etc. are used for two-way data communication and one-way data communication between a data transmitter and receiver. To prevent data from being leaked to a third party, the data is encrypted for transmission and reception between the data transmitter and receiver. The data thus transmitted and received include content data. The content data further include works such as a piece of music, image, program, text, etc. for example.

Copy of one of content data such as music, image, etc. for which a copyright is reserved will infringe the copyright in some cases even if the copied data is intended for personal use. Copying a digital data without any additional processing made of the data, namely, so-called digital copy or digital dubbing, can provide a content data with no signal deterioration even after such data copy through many generations. Therefore, such data copy has to be inhibited by some method. For example, SCMS (serial copy management system) is known in which such a copy is allowed for only one generation. In this system, an SCMS copy control code is added to or buried in a "parent" content data recorded on a CD (compact disc) and it has a value for permission of copy for only one generation, while a "child" content data obtainable at a destination apparatus by digital copy of the "patent" content data at the destination apparatus, has the SCMS copy control code thereof rewritten to a value for copy inhibition.

Generally for serving, by electronic distribution, of a content data such as music data over an Internet or satellite communication system, the content data is encrypted by a key (content key) and the content key used for the data encryption is also encrypted by another key (distribution key).

In case it is permitted as ever to copy a content data such as a piece of music for one generation, a copy control code for a "parent" content data should have a value for copy of the content data for one generation but a "child" content data obtainable at an destination apparatus by digital copy of the "patent" content data at the destination apparatus should have a copy control code thereof rewritten to a value for copy inhibition.

For sending an encrypted "parent" content to a destination apparatus capable of decrypting such an encrypted content data, it is desirable from the standpoints of a shorter processing time and labor saving to send the content data as it is (without being decrypted) to the destination apparatus. In this case, however, since a copy control code such as SCMS code has also been encrypted along with the content data or it has been buried in the content data, it will be supplied to the destination apparatus without being changed in value. On the contrary, if a content data having a copy control code rewritten to a value for copy inhibition and buried therein is sent to a destination apparatus, the content data has to be decrypted and copy control code has to be rewritten to a value for copy inhibition, and then the content data has to be encrypted again, which will need much labor and time.

SUMMARY OF THE INVENTION

Accordingly, the present invention has an object to overcome the above-mentioned drawbacks of the prior art by providing an information processor and information processing method, adapted to control, by a simple operation, copy of a content data transmitted to a destination apparatus.

The above object can be attained by providing an information processor comprising, according to the present invention:

means for receiving an encrypted content decryption key generated by encrypting, by a distribution encryption key, a content decryption key for decryption of a content data encrypted by a content encryption key;

means for decrypting, by a distribution decryption key, the received encrypted content decryption key;

means for encrypting the content decryption key decrypted by the decrypting means and a copy control code by an encryption key which can be decrypted at an external apparatus; and means for transmitting to the external apparatus the content decryption key encrypted by the encrypting means and the encrypted copy control code.

Also the above object can be attained by providing an information processing method comprising, according to the present invention, the steps of:

means for receiving an encrypted content decryption key generated by encrypting, by a distribution encryption key, a content decryption key for decryption of a content data encrypted by a content encryption key;

means for decrypting, by a distribution decryption key, the received encrypted content decryption key;

means for encrypting the content decryption key decrypted by the decrypting means and a copy control code by an encryption key which can be decrypted at an external apparatus; and means for transmitting to the external apparatus the content decryption key encrypted by the encrypting means and the encrypted copy control code.

Further, in addition to the reception of the encrypted content decryption key and transmission of the encrypted content decryption key with the copy control code, the encrypted content data is received and the received encrypted content data is transmitted to the external apparatus.

Furthermore, the content encryption key and content decryption key should preferably be a common key for an encryption by a common key encryption system and the distribution encryption key be preferably be a public key for a public key encryption system while the distribution decryption key should preferably be a secret key for a public key encryption system. The encryption key which can be decrypted at the external apparatus and the decryption key should be a common key for the common key encryption system.

Moreover, prior to the transmission by the transmitting means to the external apparatus of the encrypted content decryption key and encrypted copy control code, a mutual authentication should preferably be made between the transmitting means and external apparatus. The encryption key which can be decrypted at the external apparatus and the corresponding decryption key should preferably be a session key generated at the time of the mutual authentication, and shared by the source and external apparatuses.

DETAILED DESCRIPTION OF THE PREFERRED EMBODIMENTS

Figure 1:
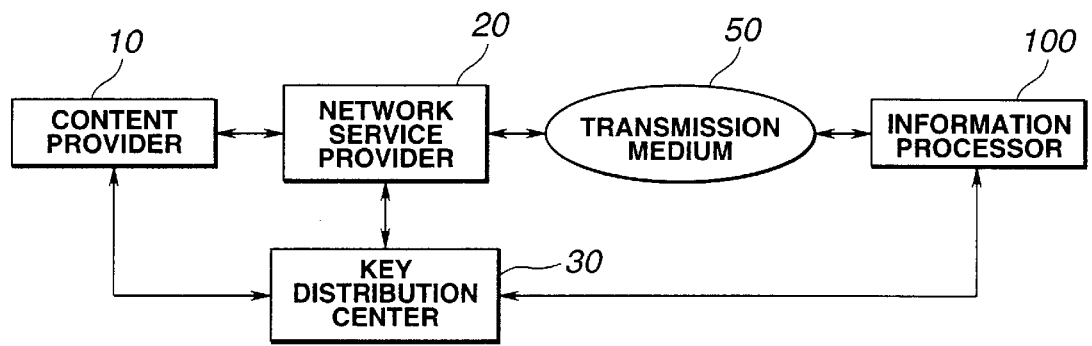
FIG. 1 is a schematic block diagram of a content distribution system using the information processor according to the present invention.

Referring now to FIG. 1, there is schematically illustrated the basic configuration of a content distribution system in which the information processor according to the present invention is adopted. As shown, the content distribution system comprises a content provider 10 holds content data including works such as image, music, program, text, etc., a network service provider 20 which supplies a content data from the content provider 10 to a user or users, a key distribution center 30 which distributes a key for distribution of a content data (distribution key), a transmission medium 50 for transmitting the content data such as satellite, cable, Internet, etc., and an information processor 100 located at the user.

The content provider 10 holds content data, inserts a water mark into a content data as necessary, and compresses and encrypts the content data. The content provider 10 encrypts, by a distribution encryption key, a content decryption key for decryption of an encrypted content data. It should be noted that the content provider 10 holds separate meta data in some cases. These data are transmitted to the network service provider 20.

The network service provider 20 receives an encrypted content data, encrypted content decryption key, etc. from the content provider 10, prices the received content data, establishes a communication channel, and transmits the content data, etc. to the user-side information processor 100 via the transmission medium 50.

The information processor 100 is located at each user, and comprises a receiver to receive information such as encrypted content data, etc. supplied from the network service provider 20 via the transmission medium 50, a storage to store the supplied data, a cryptography processor which purchases the right of utilization of the content data, prices and decrypts the content data, and others. As the cryptography processor, a security chip or the like incorporated in a PC card is employed.

The key distribution center 30 is adapted to distribute a distribution key to the user-side information processor 100, receive a charge information from the user-side information processor 100 and settle the charged money, and share a profit to the content provider 10 and network service provider 20 according to the results of the settlement. The distribution key may be either a one supplied from the content provider 10 or a one prepared at the key distribution center 30. In case a distribution key is prepared at the key distribution center 30, the latter will transmit a prepared distribution key to the content provider 10 and user-side information processor 100.

Figure 2:
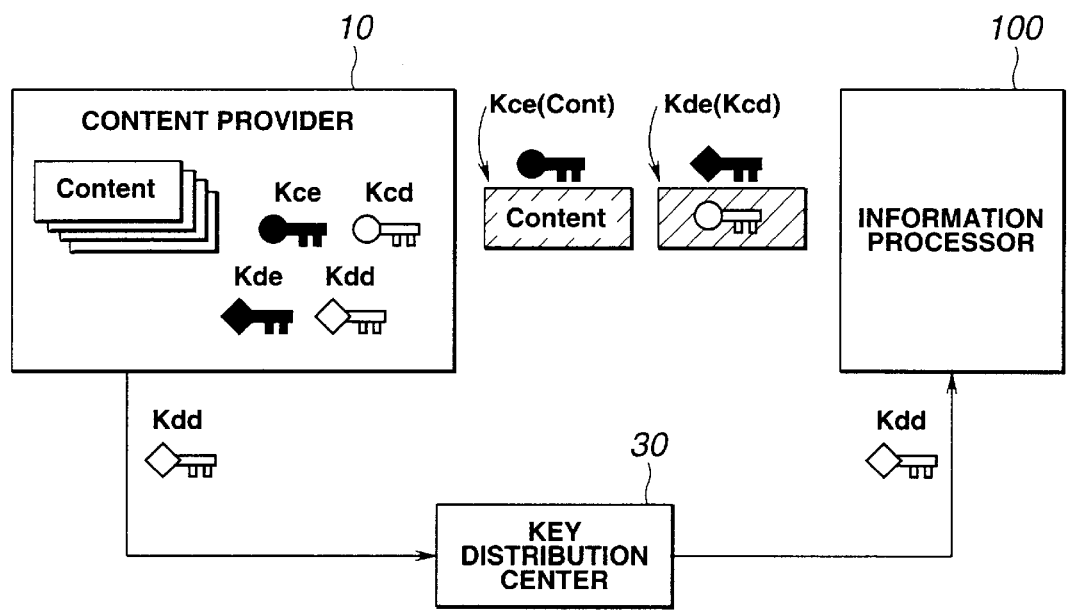
FIG. 2 is a schematic block diagram showing the distribution key generation by the content provider provided in the content distribution system.
Figure 3:
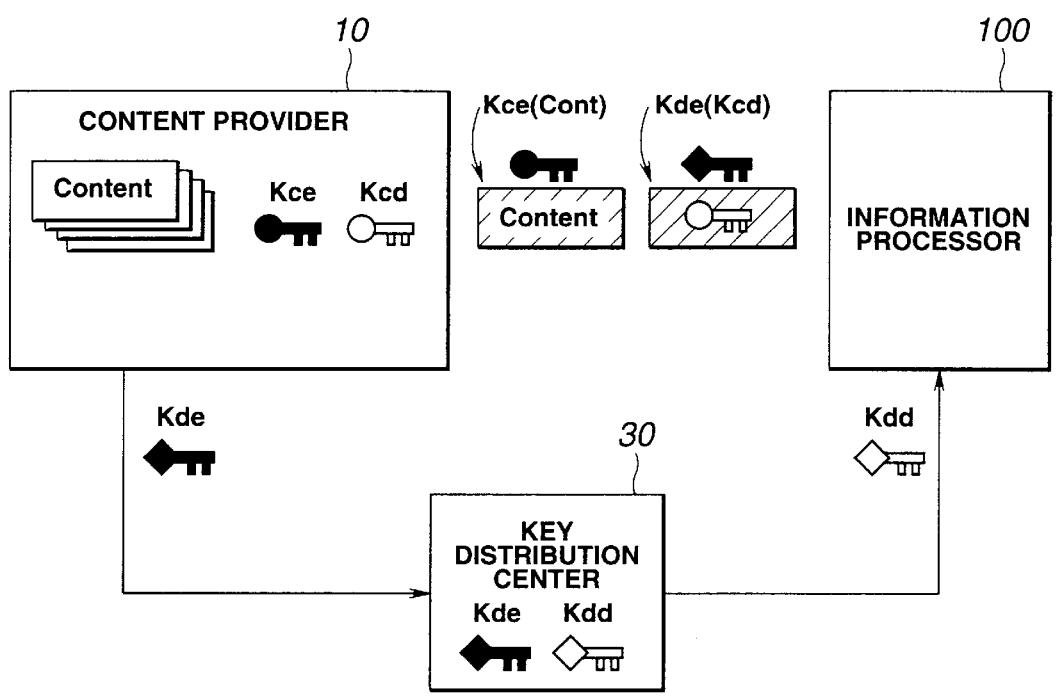
FIG. 3 is a schematic block diagram showing the distribution key generation by the key distribution center provided in the content distribution system.

In the content distribution system shown in FIG. 1, the content provider 10 generates and holds a content decryption key distribution key (as shown in FIG. 2) or the key distribution center 30 generates and holds a content decryption key distribution key (as shown in FIG. 3). It will be appreciated that the network service provider 20 is not shown in these FIGS. 2 and 3 for the simplicity of illustration and description and the hatched blocks in these FIGS. 2 and 3 indicate a content and key encrypted by encryption keys, respectively.

In FIGS. 2 and 3, it is assumed that a content encryption key for encryption of the content data is Kce, a content decryption key for decryption of the encrypted content data is Kcd, a distribution encryption key for distribution of key information, etc. is Kde and a distribution decryption key is Kdd. In a common key encryption system, a key (common key) is used for both the content encryption key Kce and content decryption key Kcd. In a public key encryption system, however, a public key is used as the content encryption key Kce while a secret key is used as the content decryption key Kcd. In case a content data to be distributed is large, a common key is used frequently for both the content encryption key Kce and content decryption key Kcd. The public key encryption system is adopted for the distribution encryption key Kde and distribution decryption key Kdd in many cases and a public key is used as the distribution encryption key Kde while a secret key is used as the distribution decryption key Kdd. However, the public key encryption system may be adopted for the distribution encryption and decryption keys. This is because the number of bits in a key is generally larger in the public key encryption system than in the common key encryption system; more processing should be done for the encryption and decryption in the public key encryption system than in the common key encryption system; and the encryption and decryption would be a great burden to the data distribution system and take much time if the public key encryption system is adopted for processing of a large data such as a content data. Of suffixes "x" and "y" used in a key symbol Kxy, "x" denotes content when it is "c" and distribution when it is "d", and "y" denotes encryption when it is "e" and decryption when it is "d".

As shown in FIG. 2, the content provider 10 generates and holds a content encryption key Kce for encryption of a content data and a content decryption key Kcd for decryption of the encrypted content data, and also generates and holds a distribution encryption key Kde for distribution of key information and a distribution decryption key Kdd.

The content provider 10 distributes the distribution decryption key Kdd to the key distribution center 30. For this key distribution, the content provider 10 first makes a mutual authentication between itself and the key distribution center 30, encrypts the distribution decryption key Kdd by a session key (provisionally used disposable key) shared by the content provider 10 and key distribution center 30, and transmits the encrypted distribution decryption key Kdd to the key distribution center 30. Also the content provider 10 encrypts the content data by the content encryption key Kce to generate an encrypted content Kce(Cont), and encrypts the content decryption key Kcd by the distribution encryption key Kde to generate an encrypted content decryption key Kde(Kcd). Then, the content provider 10 transmits the encrypted content Kce(Cont) and encrypted content decryption key Kde(Kcd) to the user-side information processor 100 via the network service provider 20 in FIG. 1.

The key distribution center 30 distributes the distribution decryption key Kdd to the user-side information processor 100. Based on the encrypted content Kce(Cont) and encrypted content decryption key Kde(Kcd) supplied from the content provider 10 and the distribution decryption key Kdd supplied from the key distribution center 30, the user-side information processor 100 decrypts a content data requested by the user by the encrypted content decryption key Kde(Kcd) and distribution decryption key Kdd, which is equivalent to the purchase of a content data. At this time, a charge information is generated and transmitted from the user-side information processor 100 to the key distribution center 30. The information processor 100 may transmit the charge information to the key distribution center 30 by the time when the distribution decryption key Kdd from the key distribution center 30 is received, for example. The user-side information processor 100 uses the content decryption key Kcd decrypted by the distribution decryption key Kdd to decrypt the encrypted content Kce(Cont), thereby providing a plaintext (decrypted) content data.

FIG. 3 shows also how the key distribution center 30 generates and holds a content decryption key distribution key. As shown, the content provider 10 generates a content encryption key Kce for encryption of the content data and a content decryption key Kcd for decryption of the encrypted content data, and the key distribution center 30 generates a distribution encryption key Kde for distribution of key information, etc. and a distribution decryption key Kdd. Therefore, the distribution encryption key Kde will be transmitted from the key distribution center 30 to the content provider 10. Of course, the key Kde is encrypted, before this transmission, by a session key having been subjected to a mutual authentication which will further be described later. The other configuration and function are similar to those having been described with reference to FIG. 2 in the foregoing, and so they will not further be described.

The "purchase" of the right of using a content data at the user-side information processor 100 is to acquire the content decryption key Kcd for decryption of an encrypted content data. More particularly, the "purchase" is to extract the content decryption key Kcd by decrypting the encrypted content decryption key Kde(Kcd) by the distribution decryption key Kdd from the key distribution center 30. With the purchased right of using content data, it is permitted to freely reproduce a content data within the information processor 100 or to digitally copy it to any other apparatus for one-generation use, for example. To inhibit such a digital copy in the ordinary SCMS (serial copy management system), etc., the SCMS copy control code buried in a content data is rewritten from a state that it may be copied for one generation to a state that it may not be copied. In the SCMS system, however, an encrypted content data has to be decrypted, rewritten in copy control code thereof as in the above and then encrypted again, which will take more time and labor. According to the embodiment of the present invention, when a purchased content data is digitally copied at the user-side information processor 100, a copy control code is added to the decrypted content decryption key Kcd, and the copy control code is rewritten to a state that the content data may not be copied. Thereafter, the content decryption key Kcd and copy control code are encrypted by an encryption key which can be decrypted at a destination external apparatus to transmit the encrypted content decryption key Kcd and copy control code to the external apparatus. The encryption of the content decryption key Kcd and copy control code will further be described later.

Purchase of a content data at the user-side information processor 100 will be described herebelow with reference to FIG. 4. The encircled numerals ① to ⑤ in FIG. 4 indicate the purchasing steps.

Figure 4:
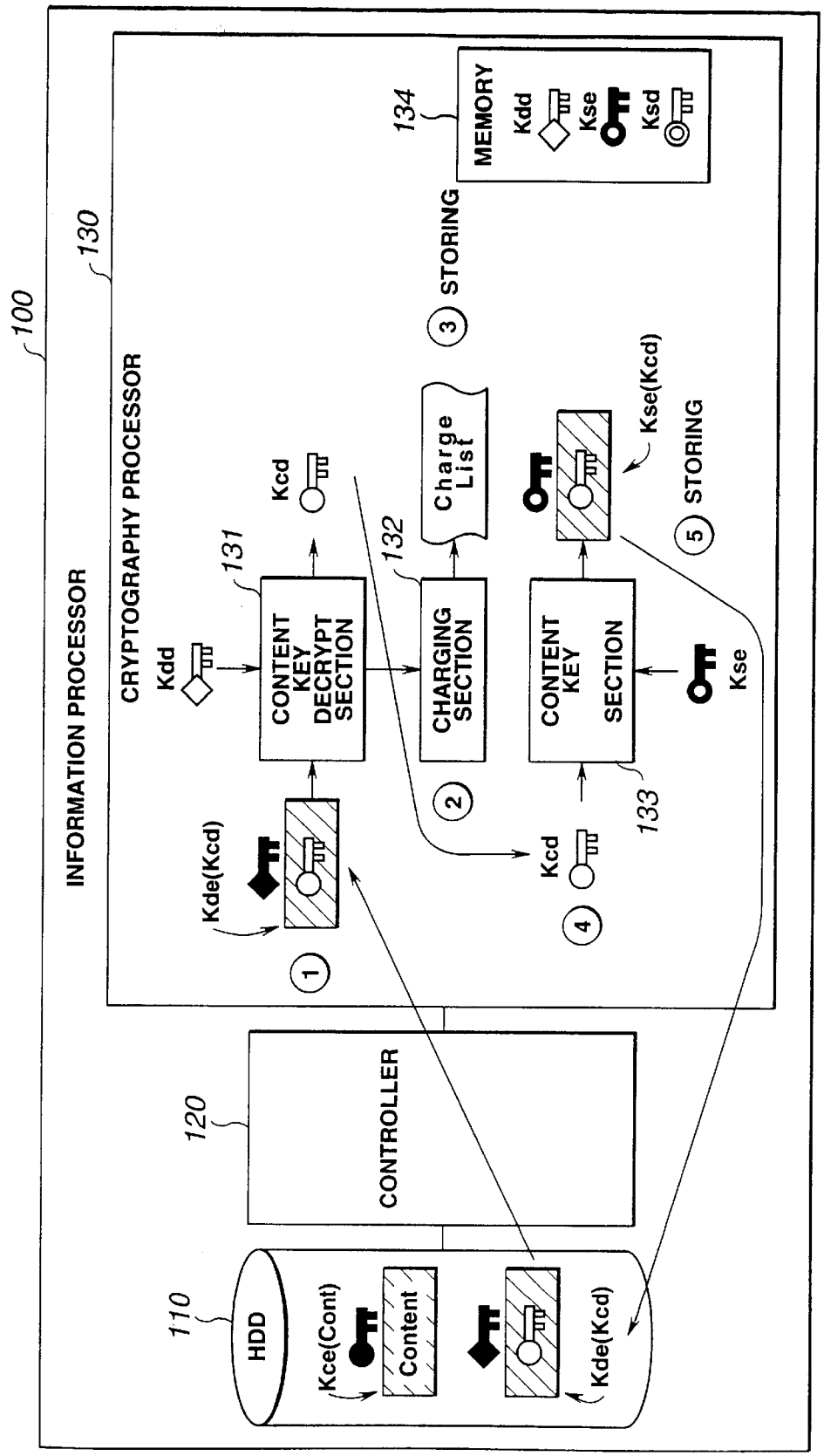
FIG. 4 is a schematic diagram showing the purchase of a content data in the information processor according to the present invention.

As will be seen from FIG. 4, the encrypted content Kce(cont) and encrypted content decryption key Kde(Kcd) from the content provider 10 are stored in a hard disc drive (HDD) 110 as a data storage medium. First at step ①, when the user selects a desired content data, a controller 120 reads from the HDD 110 an encrypted content decryption key Kde(Kcd) corresponding to the selected content data and transmits it to a cryptography processor 130. At step ②, a content key decryption section 131 of the cryptography processor 130 extracts a content decryption key Kcd by decrypting the supplied encrypted content decryption key Kde(Kcd) by a distribution decryption key Kdd received from the key distribution center 30. The cryptography processor 130 charges the user for service of the content data at a charging section 132 thereof. At step ③, a charge information (charge list) thus generated is stored in a memory 134 as a storage medium. At step ④, a content key encryption section 133 of the cryptography processor 130 encrypts the decrypted content decryption key Kcd by a storage encryption key Kse for storage of the content data at the user side, thereby generating an encrypted content decryption key Kse(Kcd). At step ⑤, the controller 120 stores in the HDD 110 the generated encrypted content decryption key Kse(Kcd) for storage of the content data at the user side. The cryptography processor 130 is provided as a security chip incorporated in a PC card, for example. The content decryption key Kcd decrypted as in the above will not be taken as it is to outside the cryptography processor 130 but will be used only within the cryptography processor 130. A used content decryption key Kcd is appropriately deleted. Also, the storage encryption key Kse and storage decryption key Ksd are buried in a security chip, for example, beforehand and written in the memory 134 at the time of manufacture.

Figure 5:
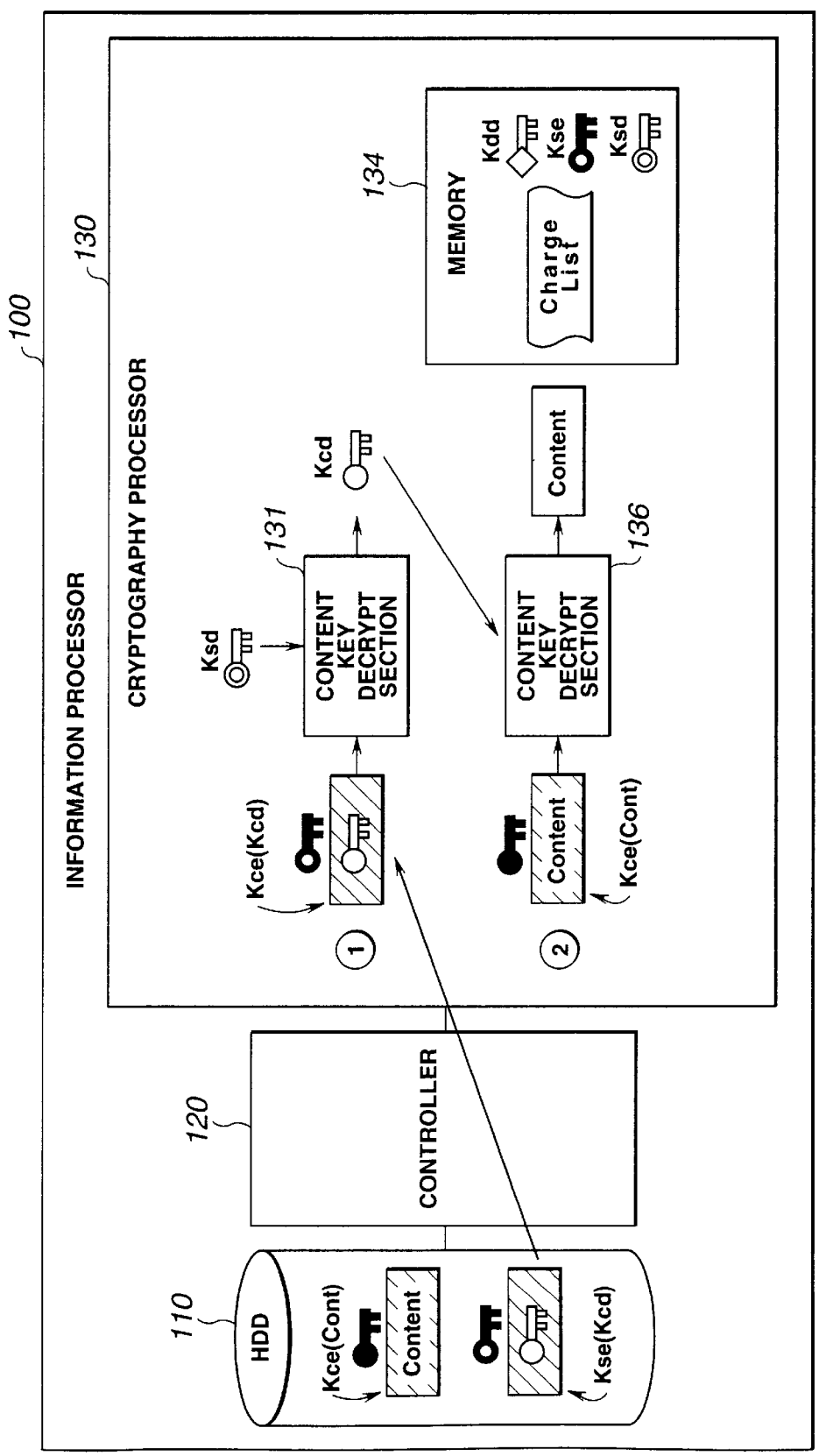
FIG. 5 is a schematic diagram showing the reproduction of a purchased content data in the information processor according to the present invention.

Next, reproduction of a content data will be described herebelow with reference to FIG. 5. As shown, the HDD 110 as a data storage medium stores a content Kce(Cont) encrypted by the content decryption key Kce and content decryption key Kse(Kcd) encrypted by the storage encryption key Kse, for at least a content data going to be reproduced. At step ①, the controller 120 reads from the HDD 110 the content decryption key Kse(Kcd) encrypted by the storage encryption key Kse and transmits it to the content key decryption section 131 in the cryptography processor 130 which in turn will decrypt the received content decryption key Kse(Kcd) by the storage decryption key Ksd from the memory 134 to extract the content decryption key Kcd. At this time, no charging is done. That is, as having been described in the foregoing with reference to FIG. 4, this embodiment of the present invention is adapted such that once charging is made for service of the content data when the content decryption key Kde(Kcd) encrypted by the distribution encryption key Kde is decrypted by the distribution decryption key Kdd, no further charging is done upon the user for subsequent use of the content. However, the present invention may be adapted so that charging is done upon the user for each use of the content data. At step ②, the controller 120 reads from the HDD 110 the content Kce(Cont) encrypted by the content encryption key Kce and transmits it to a content decryption section 136. The cryptography processor 130 decrypts the content by the decrypted content decryption key Kcd to extract a plaintext (decrypted) content data. It should be noted that many of AV (visual and audio) data are supplied as content data having been compressed by various compression coding methods. Of course, when decompressed, such data can be made audible and visible.

Figure 6:
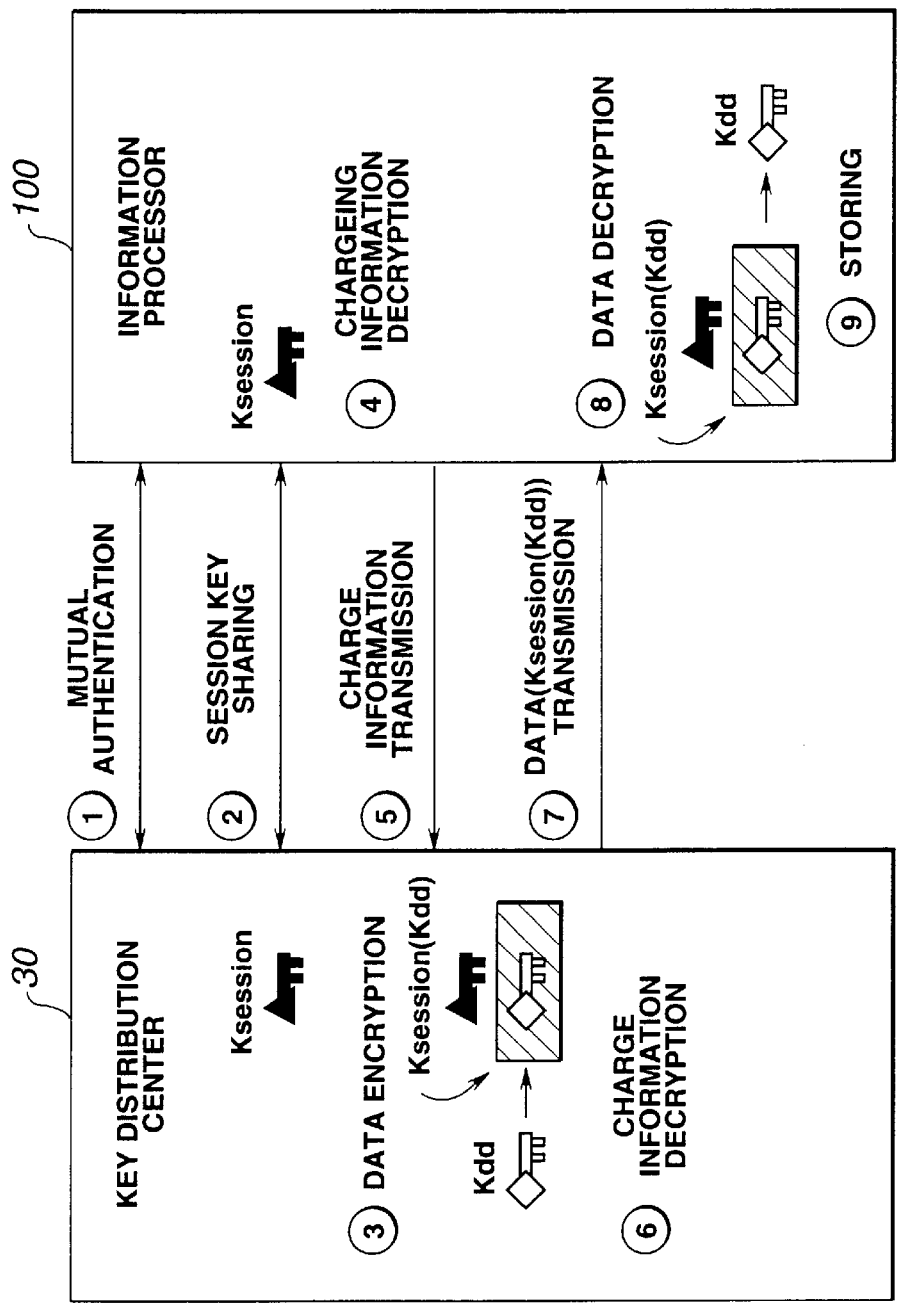
FIG. 6 is a schematic diagram showing the procedure of data transmission and reception including mutual authentication and session key sharing.

Next, mutually authenticated transmission and reception of an encrypted data will be described below with reference to FIG. 6. FIG. 6 shows a mutually authenticated transfer of the distribution decryption key Kdd between the key distribution center 30 and user-side information processor 100 shown in FIGS. 1 to 3. However, the mutually authenticated transmission and reception can be made of various kinds of information which has to be kept confidential and authenticated, such as a key, between the key distribution center 30 and content provider 10.

As in FIG. 6, at step ①, a mutual authentication is done between the key distribution center 30 and information processor 100. This mutual authentication may be done based on the ISO/IEC 9798-3 "mutual authentication by nonlinear key encryption technique". For this mutual authentication, a common session key Ksession is generated. It is temporarily used only for this communication session and discarded after that. At step ②, the session key Ksession is shared by both the key distribution center 30 and information processor 100. At step ③, the data is encrypted at the key distribution center 30. Namely, in this case, the distribution decryption key Kdd as the data is encrypted by the session key Ksession to generate an encrypted distribution decryption key Ksession(Kdd). At step ④, the information processor 100 encrypts the charge information (charge list) by the session key Ksession. At step ⑤, the encrypted charge information is transmitted to from the information processor 100 to the key distribution center 30. The key distribution center 30 receives the encrypted charge information, and decrypts it by the common session key Ksession to verify the charge information at step ⑥. When the charge information has successfully been verified, the key distribution center 30 will transmit to the information processor 100 the encrypted distribution decryption key Ksession(Kdd) being the encrypted data, at step ⑦. The information processor 100 decrypts the data at step ⑧, namely, it decrypts the encrypted distribution decryption key Ksession(Kdd) by the common session key Ksession to extract the distribution decryption key Kdd. At step ⑨, the information processor 100 stores in a predetermined memory the distribution decryption key Kdd obtained by this decryption.

Figure 7:
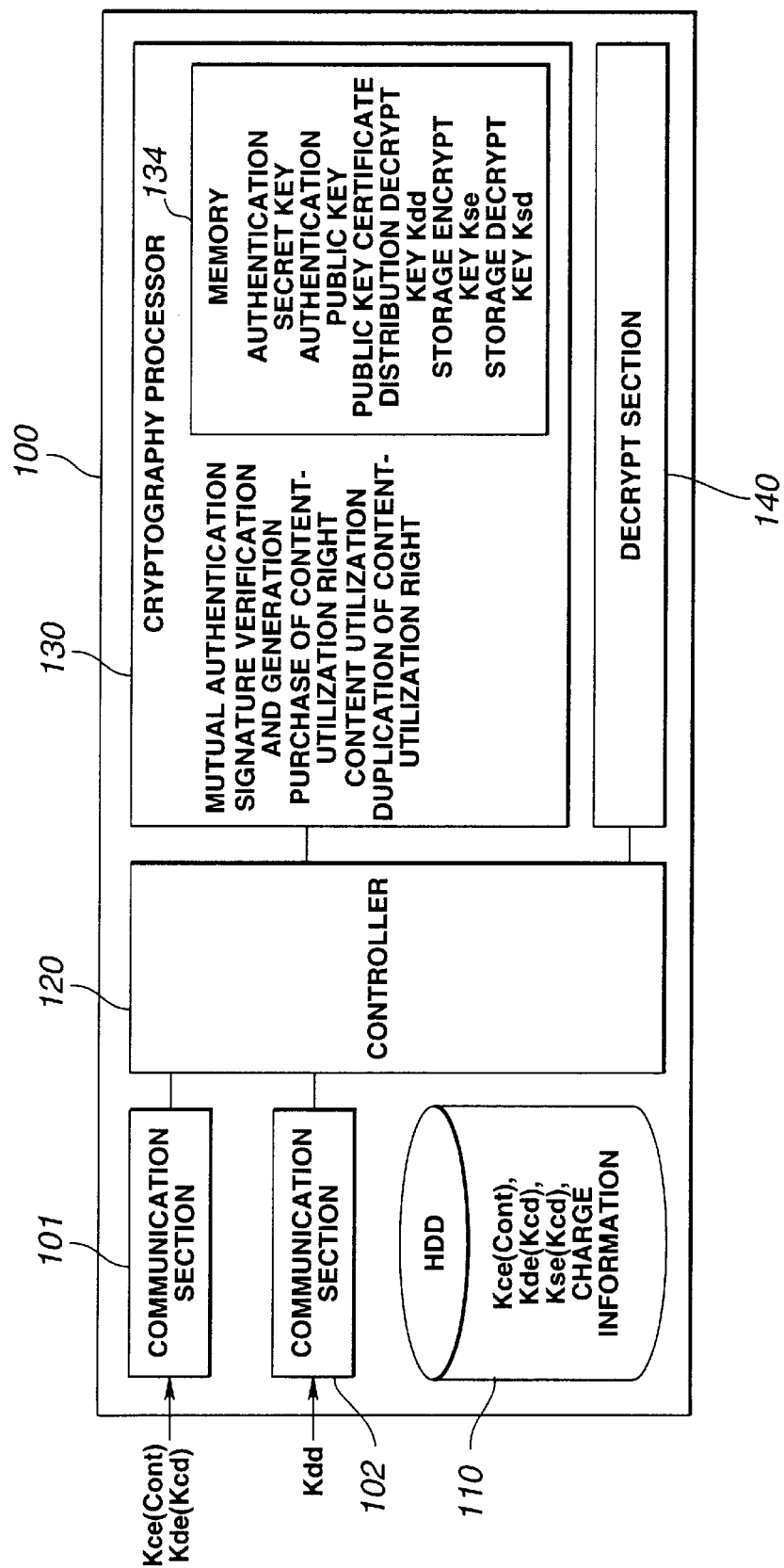
FIG. 7 is a schematic block diagram of the information processor according to the present invention.

Next, an example of the internal structure of the information processor 100 will be described with reference to FIG. 7. As shown, the information processor 100 comprises a communication section 101 which receives the encrypted content Kce(Cont) and the encrypted content decryption key Kde(Kcd), and a communication section 102 which receives the distribution decryption key Kdd. More specifically, the communication section 102 receives the distribution decryption key Ksession(Kdd) encrypted by the session key Ksession. The HDD 110 as the data storage medium stores the encrypted content Kce(Cont) and encrypted content decryption key Kde(Kcd) received by the communication section 101, encrypted content decryption key Kse(Kcd) corresponding to the purchased content data, and a charge information, for example. The information processor 130 corresponds to a PC card, for example, and has functions of mutual authentication, signature verification and generation, purchase of content-utilization right, content utilization, duplication of content-utilization right, etc. The memory 134 in the information processor 130 stores an authentication secret key, authentication public key, public key certificate, distribution decryption key Kdd, storage encryption key Kse, storage decryption key Ksd, etc. The information processor 100 comprises a decoder 140 which decodes various coded content data, as necessary, and the controller 120 provided to control the communication sections 101 and 102, HDD 110, cryptography processor 130, decoder 140, etc. It should be noted that the decoder 140 may be an MPEG decoder which can decode data coded according to the MPEG (Moving Picture coding Experts Group), ATRAC decoder which can decode data coded according to the so-called ATRAC (Adaptive TRansform Acoustic Coding) or the like.

Next, a content distribution system using the information processor according to the present invention will be described herebelow with reference to FIG. 8.

Figure 8:
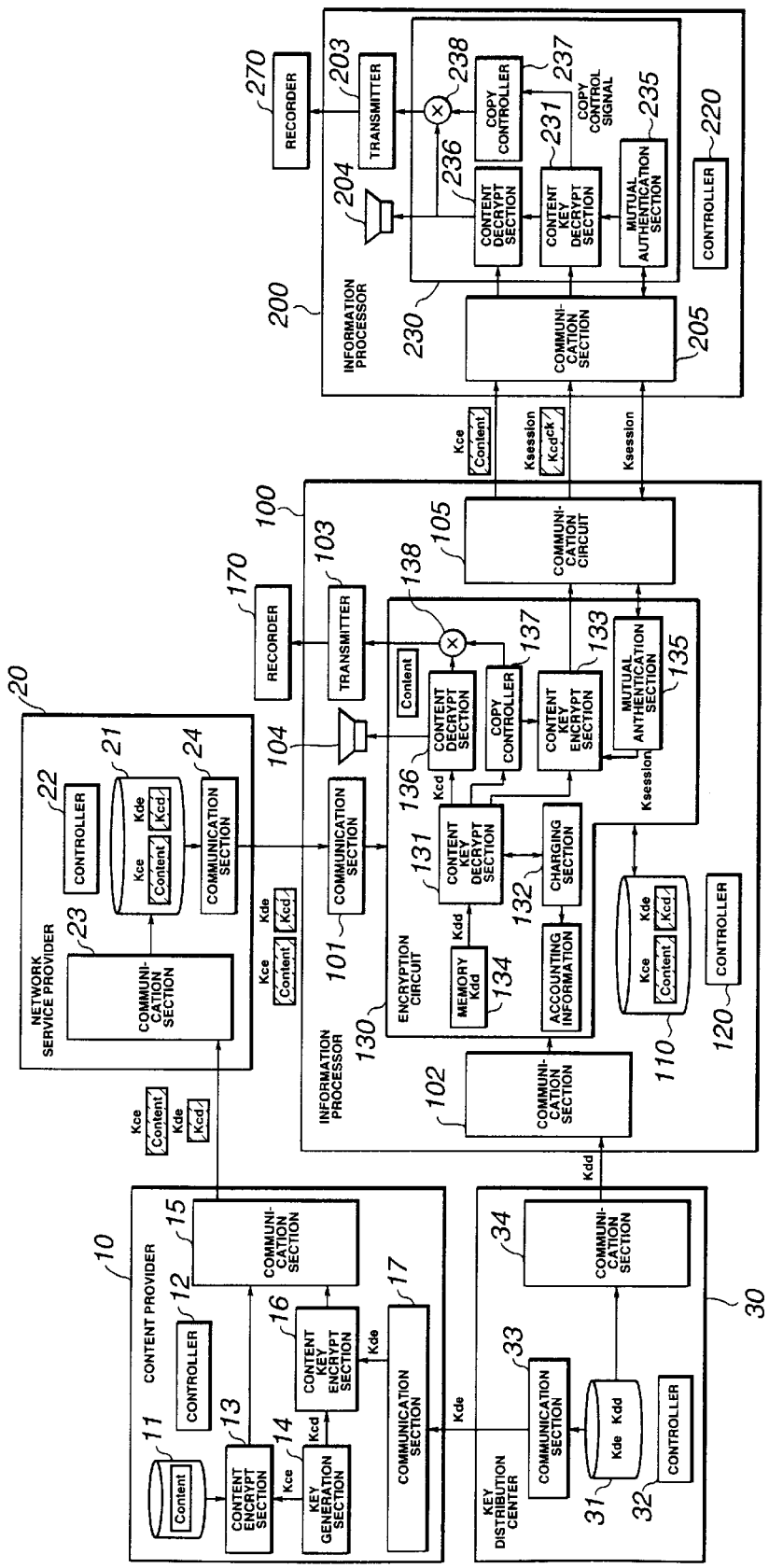
FIG. 8 is a schematic block diagram of a content distribution system in which the information processor according to the present invention is adopted.

As in FIG. 8, the key distribution center 30 shown in FIG. 3 generates distribution keys Kde and Kdd and the information processor 100 has a second information processor 200 connected thereto.

The content provider 10 comprises a content storage medium 11 to store content data, such as a hard disc drive or the like, a controller 12 to control the operation of various components of the content provider 10, a content encryption section 13 to encrypt a content data by the content encryption key Kce, a key generator 14 to generate the content encryption key Kce and content decryption key Kcd, a communication section 15 to transmit the encrypted content data and content decryption key, a content key encryption section 16 to encrypt the content decryption key Kcd generated by the key generator 14, and a communication section 17 to receive the distribution encryption key Kde.

In the content provider 10, the controller 12 has the content storage medium 11 to supply a content data to the content encryption section 13, the content encryption section 13 to encrypt the content data by the content encryption key Kce from the key generator 14 and pass a content Kce(Cont) thus encrypted to the communication section 15. Further, the controller 12 of the content provider 10 has the key generator 14 to supply the generated content decryption key Kcd to the content key encryption section 16, and the communication section 17 to send to the content key encryption section 16 the received distribution encryption key Kde, the content key encryption section 16 to encrypt the content decryption key Kcd by the distribution decryption key Kde and send an encrypted content decryption key Kde(Kcd) thus obtained to the communication section 15. The communication section 15 sends the encrypted content Kce(Cont) and encrypted content decryption key Kde(Kcd) to a communication section 23 of a network service provider 20. The distribution encryption key Kde is sent from a communication section 33 of the key distribution center 30 to the communication section 17 of the content provider 10. Of course, for data transfer between the communication sections 23 and 33 corresponding to the communication sections 15 and 17, respectively, a mutual authentication and session key sharing are done between the communication sections 23 and 33 as having previously been described with reference to FIG. 6.

As shown in FIG. 8, the network service provider 20 comprises a data storage medium 21 such as a hard disc drive to store the encrypted content Kce(Cont), encrypted content decryption key Kde(Kcd), etc., a controller 22 to control the operation of various components of the network service provider 20, the communication section 23 to receive the encrypted content Kce(Cont) and content decryption key Kde(Kcd) from the content provider 10, and a communication section 24 to transmit to the user-side information processor 100 the encrypted content Kce(Cont) and content decryption key Kde(Kcd).

In the network service provider 20, the controller 22 controls the communication section 23 to receive the encrypted content Kce(Cont) and content decryption key Kde(Kcd) supplied from the content provider 10 and the data storage medium 21 to store the received encrypted content Kce(Cont) and content decryption key Kde(Kcd), and reads out the encrypted content Kce(Cont) and content decryption key Kde(Kcd) from the data storage medium 21 as necessary for transmission to the communication section 24.

As seen from FIG. 8, the key distribution center 30 comprises a data storage medium 31 such as a hard disc drive, etc. to store the distribution encryption key Kde and distribution decryption key Kdd, a controller 32, and communication sections 33 and 34. In the key distribution center 30, the controller 32 generates a distribution encryption key Kde and distribution decryption key Kdd and stores them in the data storage medium 31, passes the distribution encryption key Kde to the communication section 33 and the distribution decryption key Kdd to the communication section 34. The communication section 33 sends the distribution encryption key Kde to the communication section 17 of the content provider 10 while the communication section 34 sends the distribution decryption key Kdd to the communication section 102 of the user-side information processor 100. Further, as having previously been described, the controller 32 of the key distribution center 30 acquires a charge information from the user and settles the charged money, and distributes a profit to each of the content provider 10 and network service provider 20 based on the settlement.

The information processor 100 in FIG. 8 is located at the user of the content data. More specifically, the information processor 100 may be an IRD (Integrated Receiver Decoder). As shown also in FIG. 7, the information processor 100 comprises the communication section 101 to receive the encrypted content Kce(Cont) and content decryption key Kde(Kcd) supplied from the network service provider 20, communication section 102 to receive the distribution decryption key Kdd supplied from the key distribution center 30, HDD 110 as a data storage medium to store the supplied data, controller 120 to control the operation of various components of the image processor 100, and a cryptography processor 130 to purchase the right of using the content data, charge the user for service of the content data and decrypt the content data, and further (as shown in FIG. 8) a transmitter 103 to deliver a content data decrypted at the cryptography processor 130 in the form of a digital signal buried in the copy control code to an external recorder 170, speaker 104 to convert a content data such as an audio signal including a piece of music to an acoustic signal for listening, and a communication section 105 to transmit an encrypted content data, etc. to the external second information processor 200.

In the information processor 100, the controller 120 controls the communication section 101 to receive the encrypted content Kce(Cont) and content decryption key Kde(Kcd) supplied from the network service provider 20 and the communication section 102 to receive the distribution decryption key Kdd supplied from the key distribution center 30. The encrypted content Kce(Cont) and content decryption key Kde(Kcd) are stored in the HDD 110, and the controller 120 reads each data corresponding to a content data selected by the user, and sends it to the cryptography processor 130. The cryptography processor 130 stores the distribution decryption key Kdd into the memory 134.

In the cryptography processor 130, a content data is purchased and reproduced as having previously been described with reference to FIGS. 4 and 5, decrypted content data is sent to the external recorder 170 for recording, and encrypted content data and key are sent to the external second information processor 200.

For purchase of a content data, the controller 120 of the information processor 100 reads a distribution decryption key Kdd from the memory 134 of the cryptography processor 130, sends it to the content key decryption section 131, and decrypts an encrypted content decryption key Kde(Kcd) corresponding to a content data selected by the user to extract the content decryption key Kcd. Also, simultaneously with the decryption of the encrypted content decryption key Kde(Kcd) at the content key decryption section 131, the controller 120 charges the user for service of the content data at the charging section 132 to provide a charge information. Upon reception of the distribution key from the key distribution center 30, the charge information is sent from the communication section 102 to the key distribution center 30 as having been described with reference to FIG. 6.

The decryption at the content key decryption section 131 includes the decryption of an encrypted content decryption key Kde(Kcd) by the distribution decryption key Kdd as having been described with reference to FIG. 5 as well as the decryption, by the storage decryption key Ksd, of a content decryption key Kse(Kcd) encrypted by the storage encryption key Kse. The content decryption key Kcd from the content key decryption section 131 is sent to a content decryption section 136, copy controller 137, content key decryption section 133, etc. where it is used, as shown in FIG. 8. The content decryption section 136 uses the content decryption key Kcd to decrypt the encrypted content Kce (Cont), and sends the decrypted content data to the transmitter 103 via a copy control code adder 138. As will further be described later, the copy controller 137 detects a copy control code added to the content decryption key Kcd, changes the copy control code according to a change of copy generation, and sends it to the copy control code adder 138. The copy controller 137 may be adapted to provide a copy control code corresponding to a change of copy generation based on information included in the copy control code such as SCMS code or the like buried in the content data. The transmitter 103 of the information processor 100 transmits to the external recorder 170 a content data in which the copy control code such as SCMS code or the like is buried. As shown in FIG. 8, the content key encryption section 133 encrypts the content decryption key Kcd from the content key decryption section 131 by a session key Ksession from a mutual authentication section 135, and sends the encrypted content decryption key Kcd to the communication section 105. In this embodiment, the content key encryption section 133 encrypts the copy control code from the copy controller 137 by adding it to a content decryption key Kcd, and sends an encrypted content decryption key Ksession(Kcd$^{cx}$) to the communication section 105. The communication section 105 makes a mutual authentication and sharing of session key Ksession between itself and a communication section 205 of the external second information processor 200 as having previously been described with reference to FIG. 6 to send the content decryption key Kcd encrypted by the session key Ksession and the encrypted content decryption key Kce to the communication section 205.

The second information processor 200 has a similar basic construction to that of the information processor 100. FIG. 8 shows an example of a one having minimum necessary functions. As shown in FIG. 8, the information processor 200 comprises the communication section 205 to receive an encrypted content Kcd(Cont), encrypted content decryption key Ksession (Kcd$^{cx}$), etc. from the communication section 105 of the information processor 100, a controller 220 to control the operation of various components of the external second information processor 200, a cryptography processor 230 to decrypt content data, a transmitter 203 to provide to an external recorder 270 a content data decrypted at the cryptography processor 230 in the form of a digital signal having a copy control code buried therein, and a speaker 204 to convert the content data of an audio signal to an acoustic signal for listening. In the example shown in FIG. 8, the cryptography processor 230 further comprises a content key decryption section 231, mutual authentication section 235, content decryption section 236, copy controller 237 and a copy control code adder 238.

In the system configuration shown in FIG. 8, a decrypted content data is digitally copied to the external recorder 170 by the information processor 100 as will be described below with reference to FIG. 9.

Figure 9:
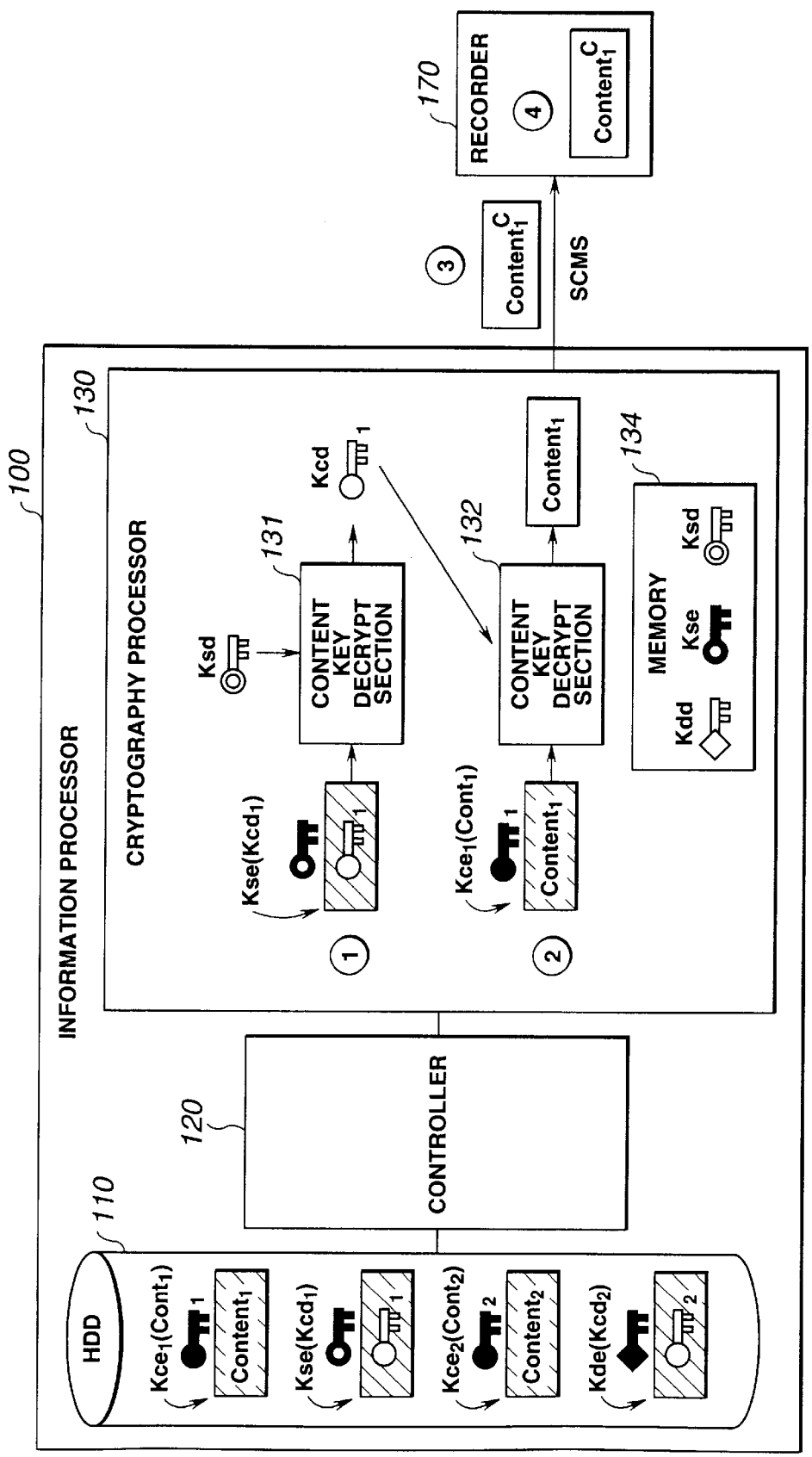
FIG. 9 is a schematic diagram showing the digital copy of a purchased encrypted content data by decryption thereof.

As shown in FIG. 9, the HDD 110 being a content data storage medium stores a plurality of content data encrypted by different content encryption keys. In FIG. 9, the plurality of encrypted content data include two, Kce$_1$(Cont$_1$) and Kce$_2$(Cont$_2$). However, more than two encrypted content data may be stored in the HDD 110. The encrypted content data Kce$_1$(Cont$_1$), for example, of these content data has been purchased and its corresponding content decryption key Kcd$_1$ is stored in the HDD 110 as a content decryption key Kse(Kcd$_1$) encrypted by the storage encryption key Kse, while the other one of the two encrypted content data, Kce$_2$(Cont$_2$), for example, has not yet been purchased and its corresponding content decryption key Kcd$_2$ is stored as a content decryption key Kde(Kcd$_2$) encrypted y the distribution encryption key Kde.

For digital copy of a purchased content data to the recorder 170, the controller 120 will read from the HDD 110 an encrypted content decryption key of a corresponding content data, for example, the encrypted content decryption key Kse(Kcd$_1$), and sends it to the content key decryption section 131 where it is decrypted by the storage decryption key Ksd to extract the content decryption key Kcd$_1$. This is done at step ①. Next at step ②, the controller 120 reads from the HDD 110 a corresponding encrypted content Kce$_1$(Cont$_1$) and sends it to the content decryption section 132 where it is decrypted by the decrypted content decryption key Kcd$_1$ to extract the content (Content$_1$). At step ③, the controller 120 adds an SCMS copy control code, for example, to the decrypted content (Content$_1$) and sends to the recorder 170 the content (Content$_1$) with the copy control code. At step ④, the content (Content$_1^C$) is extracted. More particularly, the copy controller 137 and copy control code adder 138 shown in FIG. 8 rewrite the SCMS copy control code buried in the original content data according to a change of copy generation, from a state that copy is enabled for one generation to a state that copy is disabled, for example, to send the copy-disabled content data to the recorder 170. The content (Content$_1^C$) recorded in the recorder 170 is sent to another recorder or disabled against copy. Note that any other copy control code than SCMS code may be used and the number of copy generations is not limited to first generation.

Next, sending of a purchased encrypted content Kcd (Cont) as not decrypted to the external second information processor 200 will be described below with reference to FIG. 10. For digital copy of a content data, it is taken in consideration that if the information processor 200 being a destination apparatus has a function to decrypt an encrypted content data, the content data not decrypted should preferably be sent to the destination apparatus from the standpoints of time and labor saving.

Since the copy control code such as SCMS code or the like is encrypted along with the content data or as buried in the content data, however, if the encrypted content data is sent to the destination apparatus without being decrypted, the copy control code encrypted as buried in the content data will be supplied to the destination apparatus while keeping its copy control code not changed.

In the embodiment of the present invention, a content decryption key Kcd to which a copy control code is added is encrypted for supply to the destination apparatus. That is, the information processor 100 adds a copy control code to a content decryption key Kcd corresponding to a purchased content data, encrypts the copy control code-added content decryption key Kcd$^{cx}$ by a decryptable key, for example, a session key Ksession, at the external information processor 200 being a destination apparatus to generate a copy control code-added encrypted content decryption key Ksession (Kcd$^{cx}$) which is sent to the information processor 200.

Figure 10:
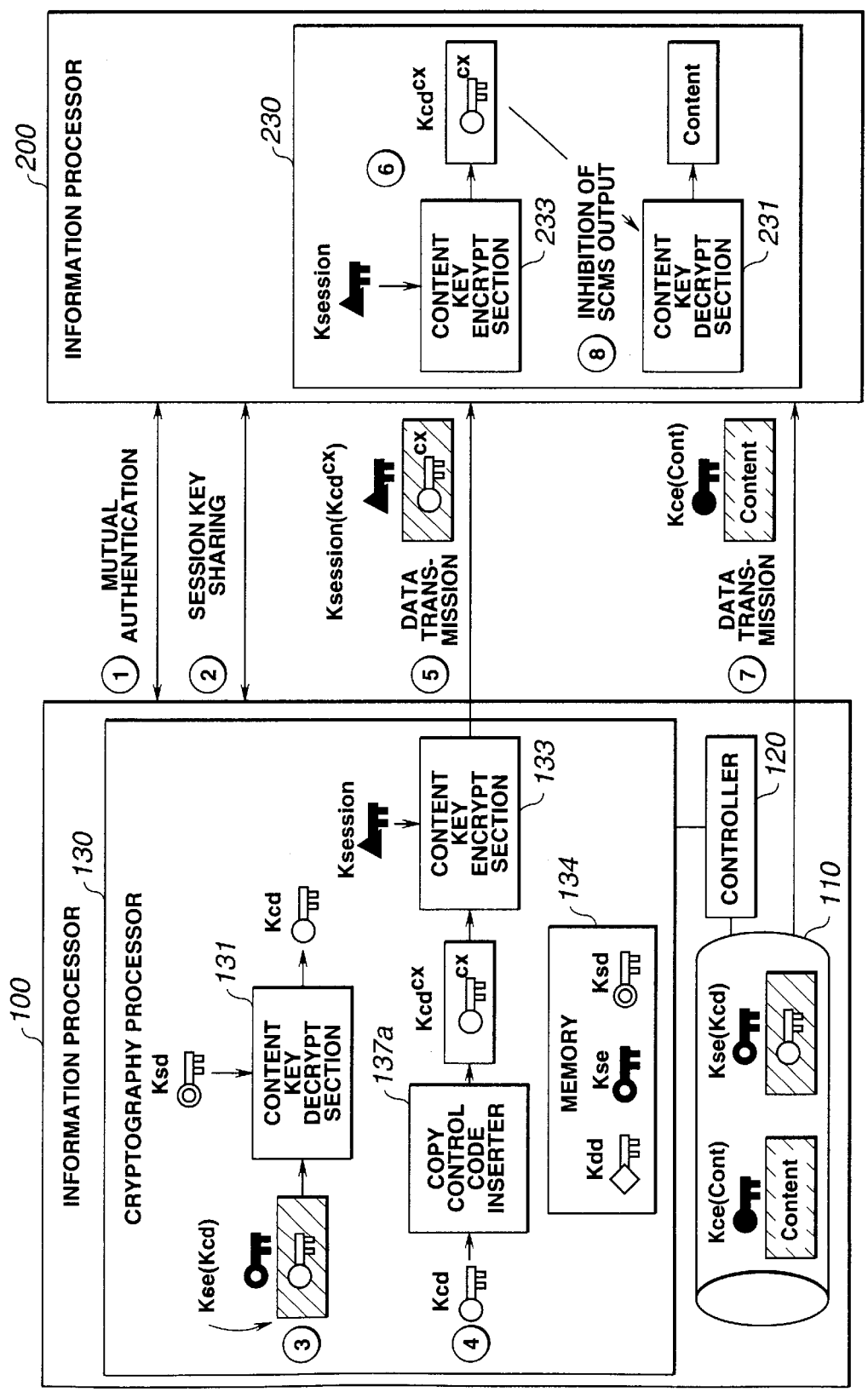
FIG. 10 is a schematic diagram showing the digital copy of a purchased encrypted content data without any processing thereof.

More particularly, at step ① in FIG. 10, a mutual authentication is made between the information processor 100 and external information processor 200 based on the prescription in the ISO/IEC 9798-3 "mutual authentication by nonlinear key encryption technique", for example. During this mutual authentication, a common session key Ksession which is momentarily used for only the communication session and discarded thereafter is generated. At step ②, the session key Ksession is shared between the information processors 100 and 200. At step ③, the information processor 100 prepares a content decryption key Kcd corresponding to a purchased content data. This operation is equivalent to a procedure that an encrypted content decryption key Kse(Kcd) stored in the HDD 110 is sent to the content key decryption section 131 where it is decrypted by a storage decryption key Ksd to extract the content decryption key Kcd. Note that the steps ① and ② may be replaced with the step ③ or they may be done simultaneously.

Next at step ④, the information processor 100 sends the content decryption key Kcd prepared at step ③ to the copy control code inserter 137a to inset a copy control code into the content data. This operation is equivalent to a procedure that when a copy control code that can be copied for one generation is added to the content decryption key Kcd beforehand, for example, the code is rewritten or changed from a state that it can be copied for one generation to a state that it may not be copied. It may be regarded as one of the functions of the copy controller 137 in FIG. 8. The content decryption key $Kcd^{cx}$ having the copy control code inserted therein is sent to the content key encryption section 133 where it is encrypted by the session key Ksession to generate a copy control code-added encrypted content decryption key Ksession($Kcd^{cx}$). At step ⑤, the data is transmitted to the information processor 200. In this embodiment, a copy control code and content decryption key $Kcd^{cx}$ are encrypted by an encryption key (session key Ksession). However, it should be noted that the copy control code and content decryption key $Kcd^{cx}$ may be encrypted by different encryption keys, respectively.

At step ⑥, the second information processor 200 sends the copy control code-added encrypted content decryption key Ksession($Kcd^{cx}$) to the content decryption section 233 where it is decrypted by the session key Ksession to extract the content decryption key $Kcd^{cx}$ having the copy control code inserted therein. At step ⑦, the information processor 100 reads the encrypted content Kce(Cont) from the HDD 110 and transmits it to the external information processor 200. At step ⑧, the information processor 200 sends the received encrypted content Kce(Cont) to the content decryption section 231 where it is decrypted by the copy control code-added content decryption key $Kcd^{cx}$ obtained at step ⑥ to obtain the content data. If the content data thus obtained by the decryption has a copy control code added thereto, priority will be given to the copy control code obtained from the copy control code-added content decryption key $Kcd^{cx}$. Alternatively, the copy control code added to the content data is compared with the copy control code added to the content decryption key $Kcd^{cx}$ and priority will be given to one of the copy control codes whichever is under severer requirements (copy inhibition or smaller number of generations for which copy is allowed).

The information processor 200 may be adapted to store in an HDD or the like (not shown) the copy control code-added content decryption key $Kcd^{cx}$ and encrypted content Kce (Cont) and extract them as necessary to reproduce a content data. The mutual authentication at step ①, sharing of a session key at step ②, and data transmission at steps ⑤ and ⑦ are of course done between the communication section 105 of the information processor 100 and communication section 205 of the information processor 200 as shown in FIG. 8.

In the content key encryption section 133 of the information processor 100 in the aforementioned embodiment, a copy control code-added content decryption key $Kcd^{cx}$ is encrypted by a session key Ksession to generate a copy control code-added encrypted decryption key Ksession ($Kcd^{cx}$). However, the copy control code and content decryption key $Kcd^{cx}$ may be encrypted separately. Generally, an encrypted copy control code and encrypted content decryption key will be sent from the content key decryption section 133 to the external information processor 200 via the communication section 105. In addition, the present invention may of course be modified in various forms without departing from the scope thereof.

As having been described in the foregoing, the present embodiment provides an information processor and information processing method adapted to receive an encrypted content decryption key generated by encrypting, by a distribution encryption key, a content decryption key for decryption of an encrypted content data encrypted by a content encryption key, decrypt, by a distribution decryption key, the encrypted content decryption key received by the receiving means, encrypt the decrypted content decryption key and copy control code by an encryption key which can be decrypted at an external apparatus, and transmit the encrypted content decryption key and encrypted copy control code to the external apparatus, thereby permitting to control digital copy of the encrypted content data simply by encryption of the decrypted content decryption key and copy control code without the necessity of decrypting the encrypted content data to add a copy control code to the content data and then encrypting the content data again.

In this case, since the encrypted content data is received and the received encrypted content data is delivered to the external apparatus, it is not necessary to decrypt the encrypted content data and encrypt the decrypted content data again. Thus, the present invention permits to reduce the labor and time for copying content data.

Further, the content encryption and decryption keys may be a common key in the common key encryption system. The distribution encryption key may be a public key in the public key encryption system while the distribution decryption key may be a secret key in the public key encryption system, whereby the labor for encryption and decryption of a content data can be reduced. Moreover, distribution encryption and decryption keys in a highly secret public key may be adopted to enhance the security of the keys.

Furthermore, prior to the delivery of the encrypted content decryption key and copy control code to the external apparatus, a mutual authentication is done between the information processor and external information processor to enable safe transfer of a copy control code-added encrypted content decryption key.

What is claimed is:

1. An information processor comprising:
    means for receiving an encrypted content decryption key generated by encrypting a content decryption key for decryption of a content data encrypted by a content encryption key and a copy control code added to the content decryption key;
    means for decrypting the received encrypted content decryption key and the copy control code added to the content decryption key;
    means for generating a renewed copy control code in accordance with the copy control code added to the content decryption key;
    means for adding the renewed copy control code to the decrypted content decryption key and encrypting the content decryption key decrypted by the decrypting means and the renewed copy control code added to the content decryption key with an encryption key which can be decrypted at an external apparatus; and
    means for transmitting to the external apparatus the content decryption key encrypted by the encrypting means and the encrypted renewed copy control code encrypted by the encrypting means.

2. The apparatus as set forth in claim 1, wherein the receiving means receives the encrypted content data; and the transmitting means transmits to the external apparatus the encrypted content data received by the receiving means.

3. The apparatus as set forth in claim 1, wherein the receiving means receives the encryption key from an external source.

4. The apparatus as set forth in claim 1, wherein the copy control code has been changed according to a change of the copy generation.

5. The apparatus as set forth in claim 1, wherein the content encryption key and content decryption key are a common key in a common key encryption system.

6. The apparatus as set forth in claim 1, wherein the content encryption key is a public key in a public key encryption system and the content decryption key is a secret key in the public key encryption system.

7. The apparatus as set forth in claim 1, wherein the distribution encryption key is a public key in a public key encryption system and the distribution decryption key is a secret key in the public key encryption system.

8. The apparatus as set forth in claim 1, wherein the distribution encryption key and distribution decryption key are a common key in a common key encryption system.

9. The apparatus as set forth in claim 1, wherein the encryption key which can be decrypted at the external apparatus and a corresponding decryption key are a common key in a common key encryption system.

10. The apparatus as set forth in claim 1, wherein the encryption key which can be decrypted at the external apparatus is a public key in a public key encryption system while the corresponding decryption key is a secret key in the public key encryption system.

11. The apparatus as set forth in claim 1, further comprising:
    means for making a mutual authentication between itself and the external apparatus before the transmitting means transmits to the external apparatus the encrypted content decryption key and the encrypted copy control code.

12. The apparatus as set forth in claim 11, wherein the encryption key which can be decrypted at the external apparatus and a corresponding decryption key are a session key generated during the mutual authentication and shared between itself and the external apparatus.

13. The apparatus as set forth in claim 1, wherein the decrypting means and encrypting means are provided together in one module.

14. The apparatus as set forth in claim 13, wherein the one module is a removable module.

15. The apparatus as set forth in claim 14, wherein the one module is a PC card.

16. The apparatus as set forth in claim 1, wherein the receiving means receives the distribution decryption key before the decrypting means decrypts the encrypted content decryption key.

17. The apparatus as set forth in claim 1, wherein the encrypting means encrypts the content decryption key and the copy control code by the same encryption key.

18. An information processing method comprising the steps of:
    receiving an encrypted content decryption key generated by encrypting a content decryption key for decryption of a content data encrypted by a content encryption key and a copy control code added to the content decryption key;
    decrypting, by a distribution decryption key, the received encrypted content decryption key;
    generating a renewed copy control code in accordance with the copy control code added to the content decryption key;
    adding the renewed copy control code to the decrypted content decryption key and encrypting the content decryption key decrypted at the decrypting step and the renewed copy control code added to the content decryption key with an encryption key which can be decrypted at an external apparatus; and
    transmitting to the external apparatus the content decryption key encrypted at the encrypting step and the encrypted renewed copy control code.

19. The method as set forth in claim 18, further comprising the steps of:
    receiving the encrypted content data; and
    transmitting the received encrypted content data to the external apparatus.

20. The method as set forth in claim 18, further comprising the step of receiving the encryption key from an external source.

21. The method as set forth in claim 18, further comprising the step of:
    making a mutual authentication between itself and the external apparatus before transmission of the encrypted content decryption key and encrypted copy control code to the external apparatus.

22. The method as set forth in claim 18, further comprising the step of
    receiving the distribution decryption key before decryption of the encrypted content decryption key.

* * * * *